Nov. 12, 1957 — I. S. LANDOW — 2,812,590
ANGLE MEASURING INSTRUMENT
Filed Feb. 15, 1955
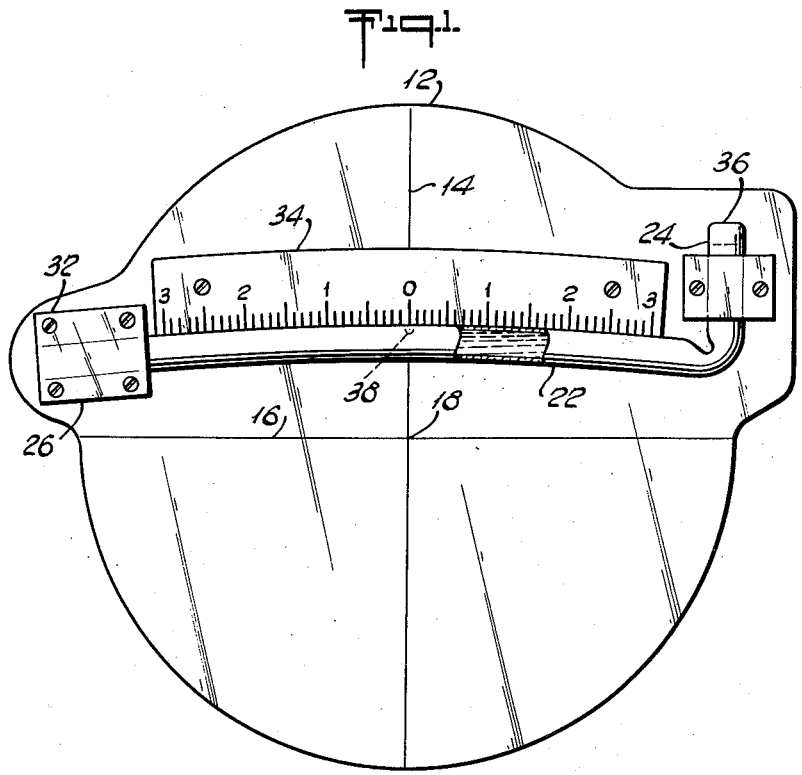
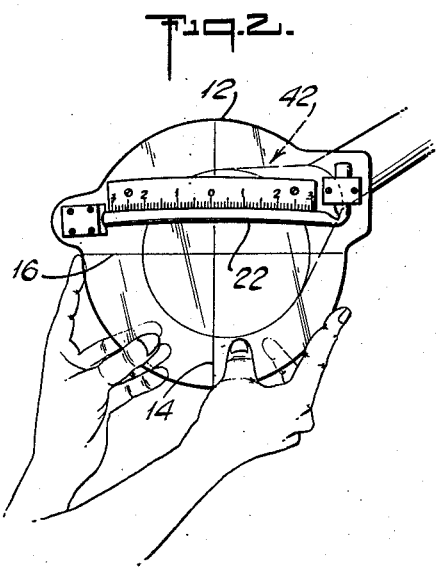
INVENTOR
IRWIN S. LANDOW

United States Patent Office 2,812,590
Patented Nov. 12, 1957

2,812,590

ANGLE MEASURING INSTRUMENT

Irwin S. Landow, Brooklyn, N. Y.

Application February 15, 1955, Serial No. 488,441

2 Claims. (Cl. 33—212)

(Granted under Title 35, U. S. Code (1952), sec. 266)

The invention described herein may be manufactured and used by or for the Government of the United States of America for governmental purposes without the payment of any royalties thereon or therefor.

This invention relates to an angle measuring instrument for determining the angle between two lines in a substantailly vertical plane and more particularly to an angle measuring instrument for use in determining the deviation from perpendicularity of a pair of rectilinear substantially perpendicular lines perceivable in a vertical plane.

This invention has general utility in measuring the angle between any line in a vertical plane and a line normal to the earth; it also has general utility in measuring the angle between any pair of lines in a vertical plane.

This invention has particular utility in checking the angular tolerance of the angle of intersection between the horizontal and vertical traces caused to be written on the face of a cathode ray tube by the influence of its horizontal deflection means and its vertical deflection means, respectively. Previously, a tube was acceptable if the angle of intersection between the horizontal and vertical traces did not differ from ninety degrees by an angle greater than plus or minus three degrees. Quality control for a tolerance of plus or minus three degrees is a relatively simple matter. However, at the present time, electrostatic cathode ray tubes, to an ever increasing extent, are being included in electronic measuring instruments. A tolerance of plus or minus three degrees is unsatisfactory for cathode ray tubes incorporated in electronic measuring instruments. Current military and commercial requirements prescribe that the tolerance for the angle of intersection of the vertical and horizontal traces shall be plus or minus a fraction of one degree. Available evidence indicates that the trend is toward decreasing this tolerance to an ever smaller fraction of one degree. Quality control of improved single-gun and multi-gun tubes by the manufacturer requires that there be provided a measuring instrument that is adapted for use in measuring the angle between the vertical and horizontal traces with a high order of precision and in a length of time that is reasonable for factory application. In connection with the angular measurement it should be kept in mind that either a horizontal or a vertical trace can be written but that both cannot be written simultaneously; the measuring instrument must be able to make the angular measurement under these conditions.

Two expedients are currently resorted to for measuring the angle or the angular deviation from perpendicularity between the horizontal and vertical traces of a cathode ray tube. One expedient includes the steps of energizing one of the deflection means of the cathode ray tube for causing a trace to be written on the face of the cathode ray tube, pasting a piece of adhesive tape on the face of the cathode ray tube so that one of its edges is aligned with the trace, deenergizing the one of the deflecting means and energizing the other of the deflecting means for causing a trace to be written on the face of the cathode ray tube that is substantially perpendicular to the aforementioned edge of the adhesive tape, and utilizing a protractor for measuring the angle between the aforementioned edge of the adhesive tape and the latter trace. With the necessary skill and by taking the proper care, one can make angular measurements with an accuracy of up to one-half degree. A second expedient substitutes a quadrille transparency for the protractor of the previously described expedient and further includes the steps of counting squares and utilizing a table of trigonometric function for obtaining the angle. Both expedients are cumbersome, time consuming, and relatively inaccurate. Instruments that are akin to surveying instruments may be used but they are totally unsatisfactory for making repeated measurements.

The angle measuring instrument of this invention includes a transparent plate of polymerized methyl methacrylate synthetic plastic, sold commercially under the name of Plexiglas. The plate is inscribed with hairlines at right angle on the front and back faces of the plate. The corresponding hairlines of opposite faces of the plate are aligned with mirror symmetry in order to eliminate errors from parallax. An arcuate glass bulb spirit level is mounted on the plate. An arcuate scale graduated in fractions of a degree is mounted on the plate adjacent the spirit level. The arcuate glass bulb spirit level is formed with a reservoir for extra gas at one end thereof whereby the size of the bubble may be adjusted. The radius of curvature of the glass bulb is on the order of ten feet to permit a high degree of instrumental precision with reasonable bubble stability. This instrument can be used to measure angles with a degree of precision that is better than plus or minus one-tenth of one degree. In use for measuring the angle between horizontal and vertical traces, respectively, this instrument does not require the simultaneous display of the traces or the location of the point of intersection of the traces.

An object of this invention is to provide an angle measuring instrument.

A further object is to provide an angle measuring instrument for use in determining the angle between a pair of rectilinear lines perceivable in a vertical plane.

A further object is to provide an angle measuring instrument for use in determining the angle of intersection between a pair of rectilinear lines perceivable on a substantially flat surface in a substantially vertical plane.

A further object is to provide an angle measuring instrument for use in determining the deviation from perpendicularity of the traces caused to be written on the face of a cathode ray tube by separate energization of its horizontal and vertical deflection means, respectively.

A further object is to provide an angle measuring instrument for use in determining the deviation from perpendicularity of the traces of a cathode ray tube caused to be written by the horizontal and vertical deflection means, respectively, without need for determining the point of intersection of the traces and without need for causing the traces to be written so that they are perceivable simultaneously on the face of the cathode ray tube.

A further object is to provide an angle measuring instrument for use in determining the deviation from perpendicularity of the traces of a cathode ray tube caused to be written by the horizontal and vertical deflection means, respectively, with an order of precision better than plus or minus one-tenth of one degree.

Other objects and many of the attendant advantages of this invention will be readily appreciated as the same becomes better understood by reference to the following detailed description when considered in connection with the accompanying drawings wherein:

Fig. 1 is a plan view of a preferred embodiment of the invention, and

Fig. 2 illustrates the embodiment of Fig. 1 in angle measuring position against the face of a cathode ray tube.

The embodiment of the invention shown in Figs. 1 and 2 includes a flat transparent plate 12. The transparent plate 12 preferably is of polymerized methyl methacrylate synthetic plastic and is preferably one-quarter of an inch thick. At least one face of the transparent plate 12 is inscribed with a pair of rectilinear hairlines 14 and 16 intersecting at 18 centrally of the plate and perpendicular to each other to a very high order of precision.

A second pair of perpendicular hairlines 14 and 16 may be inscribed on the other face of the plate 12. The corresponding hairlines are aligned with mirror symmetry for precluding errors due to parallax. An arcuate glass tube spirit level 22 of the type used in a clinometer and having a radius of curvature on the order of 10 feet is mounted on a face of the transparent plate 12. One end 24 of the tube 22 is bent away transversely relative to the main body of the tube. The tube 22 is secured to the transparent plate 12 through the use of brackets 26, 28, and screws 32; the screws 32 do not project beyond the opposite surface of the transparent plate 12. A scale 34 graduated in tenths of one degree is secured to the transparent plate 12 contiguous with the glass tube 22. Graduated scale 34 includes a central reference marking, zero, and angle graduations of one-tenth degree each, to either side of the reference marking. The center of the radius of curvature of the tube 22 lies along an extension of the inscribed line 14.

The transversely bent portion 24 of the tube 22 includes a reservoir of gas 36. There is fluid communication between transversely bent portion 24 of the tube and the remainder of tube 22. The clinometer tube structure including the transversely bent portion 24 and its included gas reservoir 36 is conventional in the art; the latter is used for adjusting the size of gas bubble 38.

To determine the angle of intersection between the horizontal and vertical traces of a cathode ray tube 42 caused to be written by the horizontal deflection means and the vertical deflection means, respectively, of the tube, the tube 42 (Fig. 2) is mounted in a supporting means and connected in circuit with conventional energizing means, not shown. The tube 42 is mounted with its axis substantially horizontal; the tube is oriented so that the traces caused to be written by its respective deflection means are substantially horizontal and vertical, respectively. The cathode ray tube 42 is then energized so that there is caused to be written a vertical trace on the face of the tube. The spot need not be centered before the vertical trace is written. The described embodiment of the invention is manually grasped and held against the face of the cathode ray tube 42 and manipulated with the fingers so that the inscribed hairline 14 is aligned with the vertical trace written on the face of the cathode ray tube 42. With the inscribed hairline 14 aligned with the vertical trace, the calibration mark on the scale 12 corresponding to the position of the bubble 38 is recorded with a notation of whether it is to the left or to the right of the zero reference mark. Then the vertical deflection means of the tube is deenergized and the horizontal deflection means is energized so that there is written a horizontal trace. The plate 12 is again held against the face of the tube and manipulated till its inscribed hairline 16 is aligned with the horizontal trace on the cathode ray tube. With the inscribed hairline 16 aligned with the horizontal trace the calibration mark corresponding to the position of the bubble 38, with a notation of whether it is to the right or to the left of the zero reference mark, is recorded. The angle of intersection of the horizontal and vertical traces of the cathode ray tube 42 differs from ninety degrees by an angle which is determined by taking the algebraic difference between the respective readings obtained from the calibrated clinometer tube 22. For example, if the reading is one degree to the left of the zero reference mark for the horizontal trace and one-half a degree to the left of the zero reference mark for the vertical trace, the algebraic difference between the two readings is one-half degree; the latter is the difference between the angle of intersection of the traces and ninety degrees. If the reading corresponding to the horizontal trace is one degree to the left of the zero reference mark and the reading corresponding to the vertical trace is one-half degree to the right of the zero reference mark the algebraic difference between the two readings is one and one-half degrees; the latter is the difference between the angle of intersection between the traces and ninety degrees.

Where the disclosed embodiment of the invention is to be used in a factory for testing cathode ray tube products, the transparent plate 12 is adapted to be supported by mechanically adjustable clamps (not shown); clamps make it unnecessary for the invention to be gripped by the fingers and are effective in reducing operator fatigue.

The scope of this invention covers a range of variations in the design of the disclosed embodiment. The transparent plate 12 has been described as polymerized methyl methacrylate synthetic plastic; this material is selected as illustrative of a preferred commercial material having the desired properties. Since it is important not to scratch the face of the cathode ray tube a material softer than cathode ray tube glass is preferred; polymerized methyl methacrylate is such a material. Furthermore, the plate 12 should not develop and store electrostatic charge too readily as a result of ordinary handling. Too much charge on the transparent plate 12 can introduce objectional effects on the traces written on the cathode ray tube face. The above material satisfies this requirement. Other commercial materials having these desired properties may be substituted.

The thickness of the plate is preferably one-quarter inch. At this thickness the lines inscribed on the opposite faces of the transparent plate 12 may be properly utilized for avoiding errors due to parallax.

The graduation marks on the scale 34 may be inscribed directly on the surface of transparent plate 12. Furthermore, the graduation marks need not necessarily have a zero reference mark in the center but may read progressively from one end thereof; there would be no need to note to which side of the zero reference mark the reading was taken. It would only be necessary to determine the difference between the readings. The tube 22, per se, is conventional and is generally of the type used in clinometers. The liquid in the tube 22 is of such viscosity so as not to unduly damp the movement of the bubble 38. The bubble is made as small as is practical under the circumstances. The bubble can be enlarged by tapping the end of the tube containing the gas reservoir 36; this is known by those skilled in the art. By tapping the end of the tube more gas is caused to enter the main body of the tube 22 thereby enlarging the size of the bubble 38. If the size of the bubble 38 is too large the entire bubble can be permitted to merge with the gas reservoir 36 by holding the tube 22 upright; then a new bubble 38 is formed by tapping the end of the tube. This method permits adjustment of the bubble size to that which is most practical. If the bubble is too large accuracy is unduly sacrificed. If the bubble is too small it can lodge somewhere along the surface of the tube 22; even if it does not lodge, it moves too slowly for practical purposes. Therefore the size of the bubble is a compromise and is selected according to the conditions of use. The scale 34 may be eliminated by etching calibration mark directly onto the surface of the tube 22.

The clinometer tube 22 need not be oriented symmetrically relative to the hairlines on plate 12 as described above. The clinometer tube 22 may have any other orientation relative to the hairlines on plate 12. In fact, for some types of angular measurements a different orientation may be essential. The angular calibration of the clinometer tube is in accordance with its orientation.

Since the thickness of a trace on a cathode ray tube face is not uniform along its entire length and sometimes is not even exactly rectilinear, the operator must be trained to understand just how to adjust the fine markings 14 and 16 relative to the thicker non-uniform traces observable on the face of the cathode ray tube. As a practical matter, this involves very little instruction and one can become proficient in the use of this instrument in a short time. The operator of the instrument need not have any scientific training for using this instrument to check cathode ray tubes, as above.

An important feature of this invention when used for checking cathode ray tubes, as above, is that the vertical and horizontal traces do not have to be displayed at the same time. Furthermore, the spot need not be centered; in fact, its position need not be determined at all.

Because the spot is not necessarily centered, it is impractical to provide the plate 12 with attached cylindrical or other suitably shaped mounting means for fastening the instrument to the end of a tube so that the plate 12 abuts the face of the tube. However, if the plate 12 is provided with cylindrical or other suitably shaped mounting means, as above, it is necessary to center the spot.

Obviously many modifications and variations of the present invention are possible in the light of the above teachings. It is therefore to be understood that within the scope of the appended claims the invention may be practiced otherwise than as specifically described.

I claim:

1. An angle measuring instrument for placement against the face of a substantially horizontal cathode ray tube for determining the angular amount by which the traces written on the tube screen under the control of the horizontal deflection means and the vertical deflection means respectively of the cathode ray tube are out of perpendicularity relative to one another, said angle measuring instrument comprising; a sheet of material that is substantially flat, transparent, rigid but substantially softer than glass, and does not store electrostatic charge readily, the largest dimension of said sheet being several inches, one of the faces of said sheet having a pair of perpendicular thin rectilinear markings intersecting substantially centrally of said sheet, whereby when said one face of said sheet is placed against the face of the cathode ray tube the markings on said sheet can be located as close as possible to traces written on the cathode ray tube screen, an angularly calibrated arcuate spirit level, having a zero reference intermediate the ends thereof and having a radius of curvature on the order of several feet, secured to the other face of said sheet, spaced from but substantially alongside one of the markings whereby when said one face of said sheet is placed against the face of the cathode ray tube and its deflection means cause substantially horizontal and vertical traces respectively to be written on the tube screen, and said one marking is aligned with a horizontally written trace, said calibrated arcuate spirit level indicates the angular amount clockwise or anticlockwise by which the horizontal trace is off horizontal and then when said other marking is aligned with a vertically written trace, said arcuate spirit level indicates the amount clockwise or anticlockwise by which the vertical trace is off vertical and whereby the algebraic difference of the angular amounts is equal to the out-of-perpendicularity of the traces.

2. An angle measuring instrument as defined in claim 1 wherein said sheet is of polymerized methyl methacrylate synthetic plastic.

References Cited in the file of this patent

UNITED STATES PATENTS

| | | |
|---|---|---|
| 764,556 | Cable | June 12, 1904 |
| 909,046 | Woolson | Jan. 5, 1909 |
| 1,163,594 | Fry | Dec. 7, 1915 |
| 1,583,965 | Dunn | May 11, 1926 |
| 1,898,162 | Bair | Feb. 21, 1933 |
| 2,527,189 | Kittelson | Oct. 24, 1950 |
| 2,557,981 | Larsen | June 26, 1951 |
| 2,690,015 | Edwards | Sept. 28, 1954 |

FOREIGN PATENTS

| | | |
|---|---|---|
| 15,752 | Denmark | Mar. 7, 1912 |
| 342,757 | Great Britain | Feb. 5, 1931 |
| 542,537 | Great Britain | Jan. 14, 1952 |